United States Patent [19]
Hendrikus

[11] Patent Number: 5,885,507
[45] Date of Patent: Mar. 23, 1999

[54] METHOD FOR ENCASING ARTICLES

[75] Inventor: Boschman Everardus Hendrikus, Aj Aerdt, Netherlands

[73] Assignee: Boschman Holding B.V., Duiven, Netherlands

[21] Appl. No.: 727,540

[22] PCT Filed: May 23, 1995

[86] PCT No.: PCT/NL95/00177

§ 371 Date: Oct. 22, 1996

§ 102(e) Date: Oct. 22, 1996

[87] PCT Pub. No.: WO95/32087

PCT Pub. Date: Nov. 30, 1995

[30] Foreign Application Priority Data

May 24, 1994 [NL] Netherlands .......................... 9400844

[51] Int. Cl.$^6$ .......................... B29C 31/08; B29C 45/02
[52] U.S. Cl. .............................. 264/272.14; 264/272.17; 264/328.4; 264/328.5
[58] Field of Search .................... 264/272.14, 272.17, 264/328.4, 328.5; 425/116, 129.1, 544

[56] References Cited

U.S. PATENT DOCUMENTS

| | | |
|---|---|---|
| 2,460,964 | 2/1949 | Adair et al. . |
| 3,659,821 | 5/1972 | Sakamoto et al. ................. 264/272.17 |
| 3,911,075 | 10/1975 | Boesch et al. ........................ 264/328.4 |
| 4,513,942 | 4/1985 | Creasman ........................... 264/272.17 |
| 4,569,814 | 2/1986 | Chong et al. ......................... 264/328.5 |
| 4,653,993 | 3/1987 | Boschman .......................... 264/272.17 |
| 4,895,503 | 1/1990 | Proska et al. ............................ 425/544 |
| 4,983,110 | 1/1991 | Yoshida et al. ..................... 264/272.11 |
| 5,000,903 | 3/1991 | Matzinger et al. ...................... 264/266 |
| 5,098,626 | 3/1992 | Pas ....................................... 264/328.4 |

FOREIGN PATENT DOCUMENTS

| | | |
|---|---|---|
| 58-138626 | 8/1983 | Japan . |
| 60-82316 | 5/1985 | Japan . |
| 63-237536 | 10/1988 | Japan . |
| 3-256712 | 11/1991 | Japan . |

*Primary Examiner*—Angela Ortiz
*Attorney, Agent, or Firm*—Young & Thompson

[57] ABSTRACT

A method for feeding plastic tablets to an installation for encasing articles such as ICs. The tablets (9) are fed horizontally in a direction perpendicular thereto when the divisible mold (2, 3) is open or closed. Feeding of the tablets takes place in a distribution channel (8). In this way, the amount of plastic can be metered more accurately and the diversity in pellet weights and dimensions can be dramatically reduced. A plunger (6) is lowered sufficiently to apply pressure against the tablets in the distribution channel (8), thereby distributing the plastic into the mold cavities (10).

13 Claims, 2 Drawing Sheets

METHOD FOR ENCASING ARTICLES

FIELD OF THE INVENTION

The invention relates to a method for encasing various 'lead frames' which are provided with integrated circuits.

BACKGROUND OF THE INVENTION

A method of this type is disclosed in the 'Patent Abstracts of Japan', vol. 13, no. 44 (E-710), 31 Jan. 1989. In this publication the use of an elongated plunger which has to be moved in a corresponding distribution cavity is described. An elongated tablet is placed in this distribution cavity. The plastic tablet is of a particular size and it is therefore also necessary to produce this tablet as a special product. The production of such elongated tablets is relatively complex and differs from the production of standard tablets. In this context reference is made to European Patent Application 0 370 564. The tablet is fed from above, i.e. in a direction parallel to the direction of movement of the plunger, in a manner which is not indicated in more detail. With this procedure, the problem arises that it is necessary to accurately determine the amount of plastic for each injection. After all, the amount of plastic must be metered depending on the size of the injected casing.

If a large number of different sizes of casing are used in a factory, this implies that a large diversity of tablets is required.

In order to solve this problem, the largest possible casing is often taken as the starting point. This means that if smaller casings are used a large amount of waste is produced. Frequently, the amount of waste will be greater than the amount of material used for the casing. Because these materials are frequently thermosetting plastics, there is no simple way of re-using them. If the tablets are to be fed through an opening in the plunger sleeve when said opening is exposed by the plunger, a relatively long stroke of the plunger is required. This leads to complications because, at least in the final phase of this so-called transfer movement, the plunger has to transmit a very high force in order to inject the plastic.

Because of the presence of the opening or the movement of the plunger completely outside the plunger sleeve, an appreciable temperature difference arises between the plunger and the plunger sleeve. Because the plunger is colder, problems arise in liquefying the tablets.

A further disadvantage is that if a machine is operated with various molds where, for example, a larger or smaller number of injections is necessary, the plunger block together with the mold must be interchanged.

U.S. Pat. No. 4,983,110 discloses a mold which has an elongated distribution cavity and rows of mold cavities located on either side. There is at least one further row of mold cavities behind each row of mold cavities. Fluid plastic originating from the distribution cavity must be transported from the first row to the second row in order to encase the articles located therein. A construction of this type is found to be inadequate in practice and leads to metering difficulties and/or errors in encasing.

It is stated in this patent that one or more tablets can be placed in the elongated mold cavity.

In the 'Patent Abstracts of Japan', vol. 16, no. 57, March 1990, a method and installation are disclosed for injecting into rows of mold cavities located opposite one another from an elongated distribution cavity. A single rectangular plunger is used for this purpose.

In the 'Patent Abstracts of Japan', vol. 9, no. 226, a distribution cavity located between two rows of mold cavities is described, the plastic tablets being fed into the distribution cavity in a direction perpendicular to the plunger and perpendicular to the distribution cavity. It can immediately be seen from the drawing that the tablets are present in the mold assembly for a relatively long period, which leads to warming of said tablets and the onset of the hardening reaction. This leads to substantial problems if a malfunction occurs in the installation. The tablets will then be exposed to this heat for a prolonged period while the installation is stationary, and it is necessary to clean the entire installation.

SUMMARY OF THE INVENTION

The aim of the present invention is to avoid the disadvantages described above and to provide a method with which the feed of the tablets is optimized, that is to say the tablets remain outside the heated environment of the mold as much as possible and for as long as possible.

By feeding the tablet or tablets in a direction which is essentially parallel to the longitudinal center line of the distribution cavity, the tablet(s) will be exposed to the sphere of influence of the mold halves for a short time only. By making the feed of the tablets independent of the plunger movement, the transfer stroke of the plunger can be shortened. Moreover, the transport path of the tablet feed no longer interferes with the movement of the plunger, with the result that it is possible to work more rapidly and with less risk of malfunction.

According to an advantageous embodiment of the invention, the tablets are introduced one after another horizontally into the distribution cavity. In this way it is possible to match the number of tablets to the amount of plastic which is required for the injection. That is to say, if a small amount of plastic is required, the tablets can be introduced some distance apart. With this arrangement, tablets of the same dimensions can always be used, irrespective of whether a large or a small amount is injected. As a result of the use of "universal" tablets, the logistics of the production process can be appreciably simplified, whilst, by varying the spacing between the tablets, the amount of plastic waste can be limited.

This implies that the length/diameter ratio of such tablets is preferably between 1.0 and 2.5.

The tablets are preferably fed via the side of the preferably closed mold, the plunger being in the opened position. This implies that the feed path is executed completely separately from the plunger movement.

With the method described above, it is possible continuously to hold the plunger of the plunger means and the plunger sleeve in continuous engagement with one another, so that optimum heat transfer takes place. Since, according to the invention, the tablets can now be fed horizontally, there is a larger surface which is in contact with the distribution cavity, as a result of which heat transfer can take place more rapidly. As a result of the higher temperature of the plunger, rapid liquefaction of the tablets is also promoted, as a result of which there is an improvement in the overall quality of the casing.

The invention also relates to an installation for encasing various 'lead frames' which are provided with integrated circuits and arranged in two mold cavities of a mold which are located opposite one another, comprising a divisible mold having an elongated distribution cavity arranged between the rows of mold cavities located opposite one another, wherein one of the mold parts is provided with a receptacle for plunger means, which plunger means are equipped for forcing out the plastic which is supplied in tablet form, brought into the distribution cavity and rendered liquid, wherein feed means for the plastic material in tablet form are provided, wherein the feed means for plastic material in tablet form are arranged alongside the plunger means and equipped for placing the plastic material in tablet form directly into the distribution cavity along a path essentially parallel to the longitudinal center line of the distribution cavity, and wherein the distribution cavity contains an elongated channel extending in the feed direction of the tablets.

If, for certain applications, the tablets have to be placed a certain distance apart, it is possible to fit an insert in the channel, which insert has constrictions such that the parts of the channel located between the tablets have a relatively small cross-sectional surface area.

With the construction according to the invention, it is possible to construct the plunger means such that they are optimum for the sole remaining task, i.e., forcing out the plastic. Because it is no longer necessary to take account of transport of the tablets effected by the plunger means by take-up of the plunger, it is possible to construct the plunger means with a plunger of elongated shape. That is to say, instead of a number of circular plungers located alongside one another, as is known from the prior art, a single elongated plunger which can be driven by one or more plunger rods can suffice. A plunger of this type is preferably of rectangular construction. The consequence of the use of an elongated plunger, i.e., a plunger which extends over essentially the entire surface of the distribution channel, is that it is no longer necessary to change the plunger means when changing the mold for a mold which has a larger or smaller number of mold cavities. Only if the plunger sleeve is connected to the mold to be changed is it necessary to change the plunger sleeve, but the plunger sleeve can be a universal article which has the same dimensions for all molds.

The installation according to the invention can be employed both for pilot (manual) use and for large-scale use.

Further advantageous embodiments of the invention can be seen from the sub-claims.

BRIEF DESCRIPTION OF THE INVENTION

The invention will be explained in more detail below with reference to an illustrative embodiment shown in the drawings. In the drawings.

DESCRIPTION OF THE PREFERRED EMBODIMENTS

Figure 1:
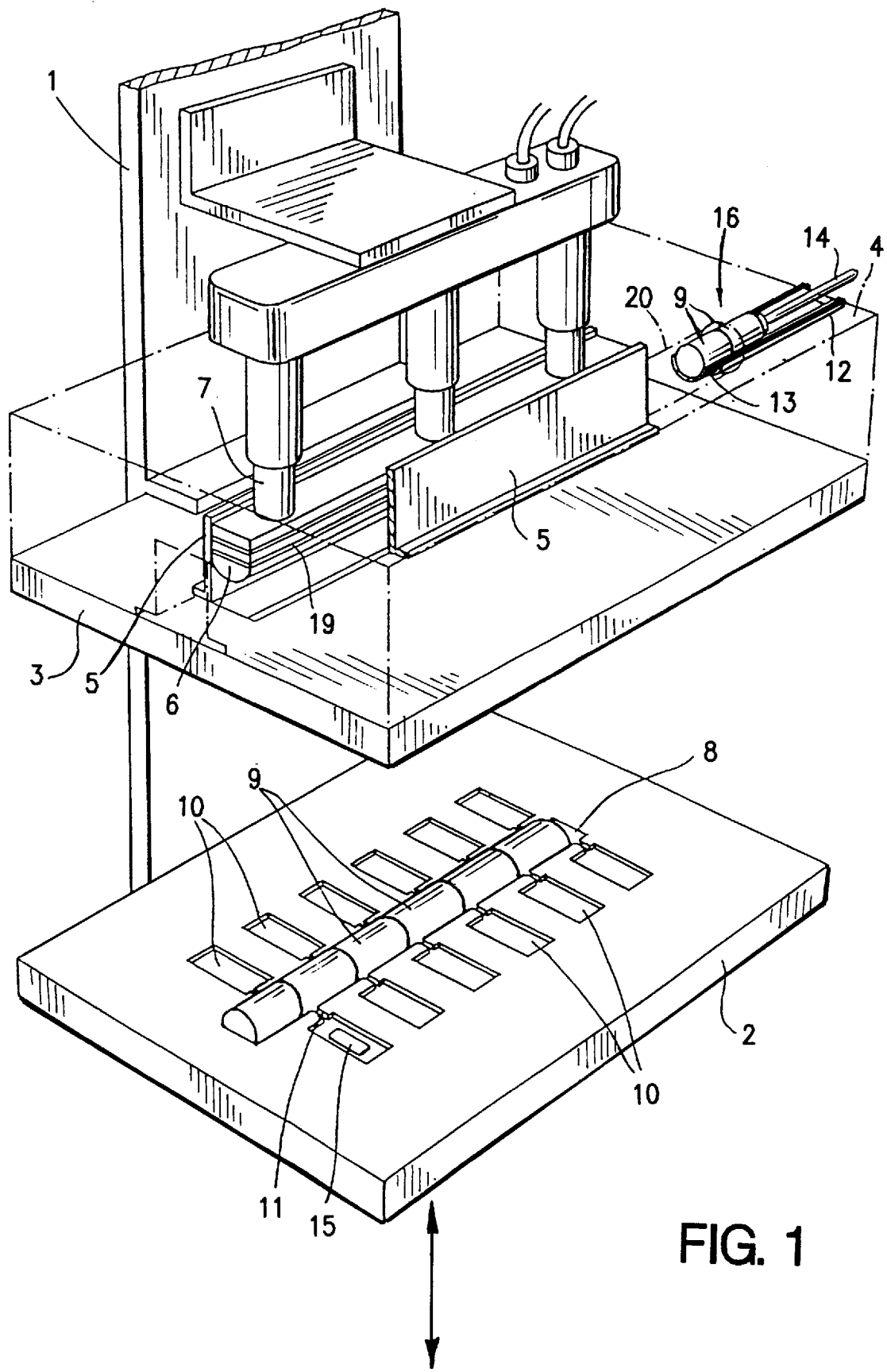
FIG. 1 shows, diagrammatically, a perspective and partially exposed view of part of the installation according to the invention in the open state.
Figure 2:
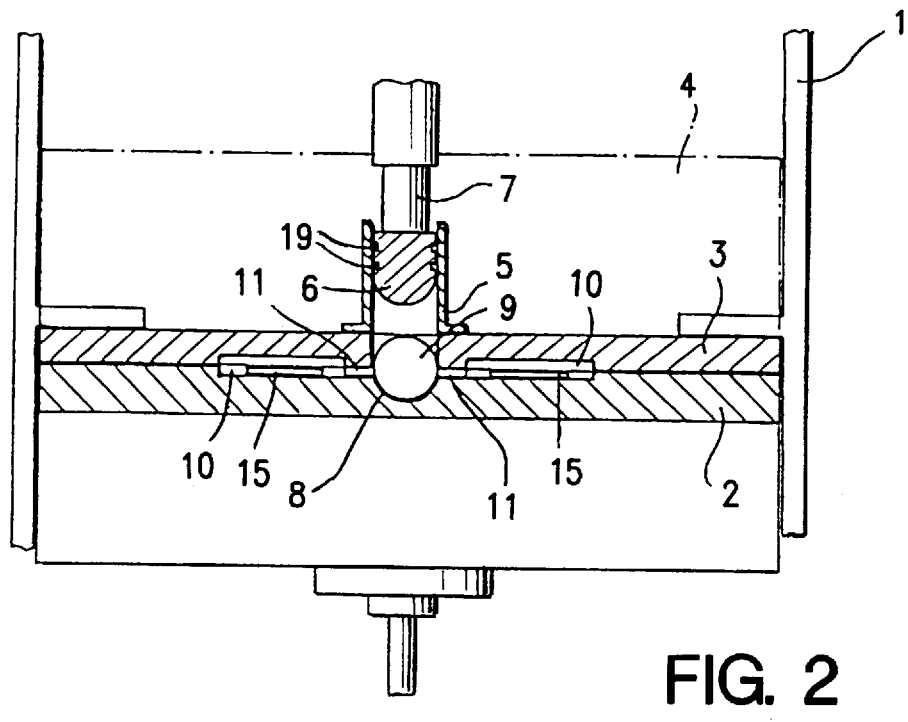
FIG. 2 shows a cross-section of the installation according to is the invention in the closed state.

In FIGS. 1 and 2 the frame to which a lower mold 2 is movably attached is indicated by 1. The upper mold 3 is firmly fixed to the frame 1. The drive for lower mold 2 is not shown in more detail and this drive is generally known from the prior art.

Mold cavities 10 for accommodating an integrated circuit 15, shown diagrammatically, and for injection of plastic around the integrated circuit are arranged in both the upper mold 3 and the lower mold 2. Such plastic is fed through injection channel 11, which, in turn, is connected to distribution channel 8. Plunger sleeve 5, in which a rectangular plunger 6 can move upwards and downwards driven by plunger rods 7, is located above distribution channel 8. Part of plunger sleeve 5 is arranged in upper block 4, which is also provided with heating means, which are not shown. Plunger 6 is provided with peripheral grooves 19, which during operation will become filled with plastic and provide a seal. The remainder of plunger sleeve 5 is arranged in upper mold 3.

The tablets 9 are introduced into distribution channel 8, with the aid of device 16, through a lateral opening 20 made in the upper mold 3. This device 16 comes into operation when upper mold 3 and lower mold 2 are closed with respect to one another. The device consists of a support 12, on which an elongated spoon 13 is arranged. A number of tablets are arranged on said spoon 13, by hand or automatically. While it is carrying the tablets, spoon 13 is then moved inwards, i.e., to the left in the drawing. At the same time as this movement is made, pin same movement. After spoon 13 has moved accurately above the position furthest to the left in FIG. 1 for placing a pellet above the distribution channel 8, spoon 13 is retracted whilst the position of pin 14 is maintained. As a result, the pellet furthest to the left drops into distribution channel 8. By further retraction of spoon 13, optionally in combination with retraction of pin 14, tablets 9 can be placed in position. These tablets can be arranged lying against one another, as shown in FIG. 1, but it is also possible to introduce these tablets some distance apart. Plunger 6 has no influence whatsoever on the introduction of the tablets. Plunger 6 can now be moved downwards. In the meantime, heat transfer has taken place between the tablets 9, which are lying with a relatively large surface area in contact with the distribution channel 8, and the lower mold 2. Plunger 6 then has to execute a relatively small stroke in order to reach the tablets and to distribute the plastic material, which has liquefied as a result of the influence of pressure and temperature, in mold cavities 10. Because plunger 6 remains continuously in contact with plunger sleeve 5, optimum heat transfer can take place. In the embodiment according to the drawing, operation of plunger 6 is effected by means of jacks.

If a product subsequently has to be encased for which a smaller amount of plastic is needed, it is necessary only to replace lower mold 2 and upper mold 3 with the new, appropriate mold cavities. In general, universal sleeve 5 will then likewise be replaced, because said sleeve forms part of the upper mold, but plunger 6, which is likewise universal for every application, does not need to be replaced.

If a smaller amount of plastic is needed, it is then possible to use a smaller number of tablets 9. These tablets can be arranged a small distance apart.

Figure 3:
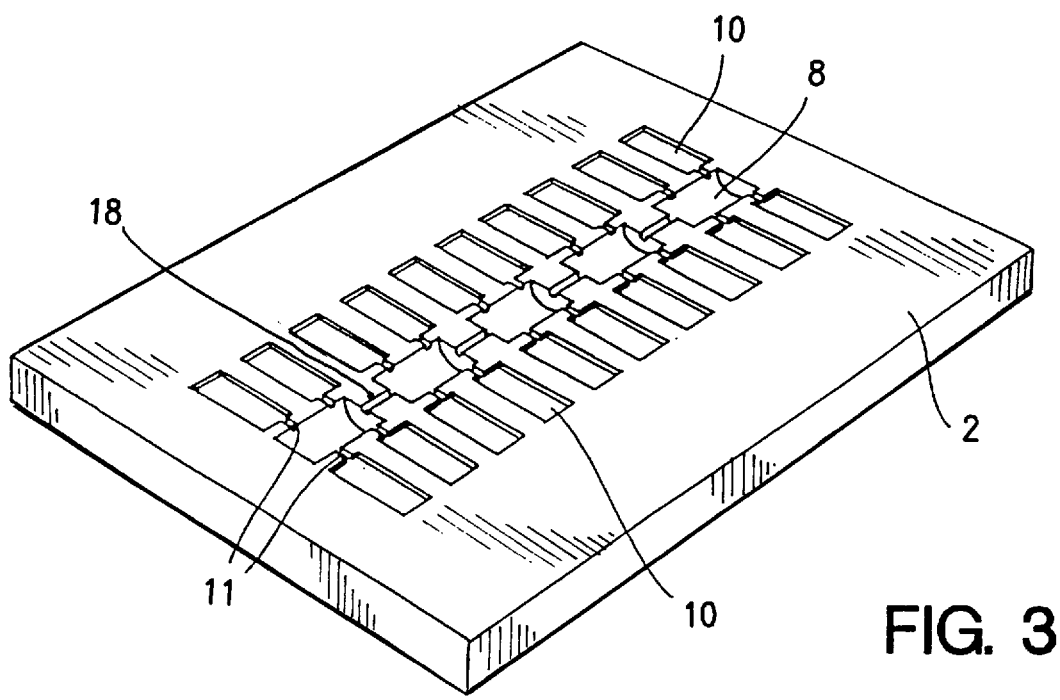
FIG. 3 shows a different embodiment of the distribution channel according to the invention.

In this case, the empty space between the tablets can be reduced by providing the distribution channel 8 with constrictions 18 (see FIG. 3).

Although the invention has been described above with reference to a preferred embodiment, it must be understood that numerous modifications can be made thereto without going outside the basic concept of the present invention. For instance, it is possible to arrange the upper mold so that it is movable. In the case of such a so-called 'bottom transfer', the plunger and plunger sleeve remain assembled and the tablets have to be introduced into the plunger pot from above when the mold is open. The essential characteristic of the invention is that the tablets are processed horizontally instead of vertically. This means that the pellets are preheated horizontally.

I claim:

1. A method for encapsulating a lead frame connected to an integrated circuit, comprising the steps of:

horizontally transporting a plastic tablet to a location above a distribution channel by supporting a bottom of the plastic tablet with a movable elongated spoon and pushing an end of the tablet with a pin to the location;

dropping the tablet into the distribution channel; and urging plastic in the tablet to flow into a mold cavity of a mold connected to the distribution channel by vertically depressing an elongated plunger against the tablet, the mold cavity having a lead frame and defining a maximum size for an encapsulated lead frame.

2. The method according to claim 1, further comprising the step of sequentially repeating said transporting and dropping steps to fill a length of the distribution channel with successive tablets.

3. The method according to claim 1, wherein said dropping step includes horizontally retracting the spoon from under the bottom of the tablet.

4. The method according to claim 1, wherein the mold includes an upper mold and a lower mold, the lower mold defining the distribution channel and the mold cavity, the upper mold defining an opening through which the plastic tablet is dropped.

5. The method according to claim 2, wherein the distribution channel includes a portion having a reduced transverse cross-section.

6. The method according to claim 1, wherein said urging step includes engagingly guiding the plunger with a plunger sleeve.

7. The method according to claim 2, wherein each of the successive tablets has a length to diameter ratio between 1.0 and 2.5.

8. An apparatus for encasing a lead frame connected to an integrated circuit, comprising:

an upper mold defining an elongated opening and having a lateral opening;

a lower mold defining a distribution channel below and extending parallel to said elongated opening, and defining a mold cavity in communication with said distribution channel;

feed means designed to pass through the lateral opening for horizontally transporting at least one plastic tablet to a location above said elongated opening and said distribution channel, and for dropping the tablet into said distribution channel, the feed means comprising a movable elongated spoon supporting a bottom of the plastic tablet and a pin to push the tablet off the spoon; and plunger means for urging plastic in said tablet to flow from said distribution channel into said mold cavity.

9. The apparatus according to claim 8, wherein said distribution channel includes a portion having a reduced transverse cross-section.

10. The apparatus according to claim 8, wherein said plunger means includes an elongated plunger, a plunger rod to drive said plunger, and a plunger sleeve through which said plunger is driven.

11. The apparatus according to claim 8, further comprising a machine part on a side of said upper mold opposite to a side of said upper mold to which said lower mold faces, said plunger means located in said machine part.

12. The apparatus according to claim 8, wherein said plunger means include a plunger and an elongated sleeve continuously engaging a lateral periphery of said plunger to guide said plunger through said opening of said upper mold.

13. The apparatus according to claim 12, wherein said plunger sleeve is detachably fixed to said upper mold.

* * * * *

UNITED STATES PATENT AND TRADEMARK OFFICE
CERTIFICATE OF CORRECTION

PATENT NO. : 5,885,507
DATED : March 23, 1999
INVENTOR(S) : Everardus Hendrikus BOSCHMAN It is certified that error appears in the above-indentified patent and that said Letters Patent is hereby corrected as shown below:

On the title page, in Item [19], change "Hendrikus" to --Boschman--.

On the title page, in Item [75] Inventor: change "Boschman Everardus Hendrikus" to --Everardus Hendrikus Boschman--.

Signed and Sealed this

Twenty-seventh Day of July, 1999

*Attest:*

Q. TODD DICKINSON

*Attesting Officer*     Acting Commissioner of Patents and Trademarks